(12) United States Patent
Maienschein et al.

(10) Patent No.: US 10,663,050 B2
(45) Date of Patent: May 26, 2020

(54) TORQUE TRANSMISSION DEVICE

(71) Applicant: Schaeffler Technologies AG & Co. KG, Herzogenaurach (DE)

(72) Inventors: Stephan Maienschein, Baden-Baden (DE); Christian Gradolph, Rohrbach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 113 days.

(21) Appl. No.: 15/558,737

(22) PCT Filed: Mar. 22, 2016

(86) PCT No.: PCT/DE2016/200149
§ 371 (c)(1),
(2) Date: Sep. 15, 2017

(87) PCT Pub. No.: WO2016/150441
PCT Pub. Date: Sep. 29, 2016

(65) Prior Publication Data
US 2019/0003565 A1  Jan. 3, 2019

(30) Foreign Application Priority Data
Mar. 25, 2015  (DE) .......................... 10 2015 205 398

(51) Int. Cl.
*F16H 45/02* (2006.01)
*F16D 23/12* (2006.01)
(Continued)

(52) U.S. Cl.
CPC ............. *F16H 45/02* (2013.01); *F16D 13/40* (2013.01); *F16D 23/12* (2013.01);
(Continued)

(58) Field of Classification Search
CPC .......... F16H 45/02; F16H 23/12; F16H 13/40; F16H 2045/0205; F16H 2045/0226;
(Continued)

(56) References Cited

U.S. PATENT DOCUMENTS 6,851,532 B2 * 2/2005 Back ........................ F16H 45/02
  192/113.35
8,342,306 B2 * 1/2013 Werner ............. F16F 15/12353
  192/3.3
(Continued)

FOREIGN PATENT DOCUMENTS

CN 101305218 A 11/2008
DE 10132065 A1 6/2002
(Continued)

OTHER PUBLICATIONS

International Search Report for PCT/DE2016/200149; 3 pgs; dated Aug. 4, 2016 by European Patent Office.

*Primary Examiner* — Tinh Dang
(74) *Attorney, Agent, or Firm* — LeKeisha M. Suggs

(57) ABSTRACT

A torque transmission device between an input side and an output side including a torque converter having a pump, a turbine, a lockup clutch for transmitting a torque between the input side and the output side, and a torsional vibration damper arranged in a casing. The lockup clutch has a clutch input coupled to the casing, a clutch output rotatable relative to the input, and an actuating element for actuating the lockup clutch. The torsional vibration damper has at least one first damper stage comprising a first damper input part and a first damper output part, which can be rotated to a limited extent relative to the first damper input part by the action of at least one first energy storage element, wherein an absorber mass is attached to one of the damper components.

7 Claims, 3 Drawing Sheets

(51) Int. Cl.
　　　*F16D 13/40*　　(2006.01)
　　　*F16F 15/123*　　(2006.01)
　　　*F16F 15/14*　　(2006.01)
(52) U.S. Cl.
　　　CPC ...... *F16F 15/12353* (2013.01); *F16F 15/145* (2013.01); *F16D 2023/123* (2013.01); *F16H 2045/0205* (2013.01); *F16H 2045/0226* (2013.01); *F16H 2045/0263* (2013.01); *F16H 2045/0278* (2013.01)
(58) Field of Classification Search
　　　CPC ...... F16H 2045/0263; F16H 2045/0278; F16F 15/12353; F16F 15/145; F16D 2023/123
　　　See application file for complete search history.

(56) References Cited

U.S. PATENT DOCUMENTS

| | | | |
|---|---|---|---|
| 9,303,700 B2* | 4/2016 | Lindemann | F16H 41/24 |
| 9,360,058 B2* | 6/2016 | Jameson | F16D 33/18 |
| 9,528,586 B2* | 12/2016 | Depraete | F16H 45/02 |
| 9,845,854 B2* | 12/2017 | Depraete | F16H 41/30 |
| 2015/0021135 A1* | 1/2015 | Jameson | F16D 33/18 192/3.28 |
| 2015/0021137 A1 | 1/2015 | Lindemann et al. | |
| 2015/0068857 A1 | 3/2015 | Lindemann et al. | |
| 2017/0227101 A1* | 8/2017 | Depraete | F16H 45/02 |

FOREIGN PATENT DOCUMENTS

| | | |
|---|---|---|
| DE | 102013202661 A1 | 9/2013 |
| GB | 2338538 A | 12/1999 |
| KR | 20130045719 A | 5/2013 |
| WO | 2015081953 A1 | 6/2015 |
| WO | 2016004945 A1 | 1/2016 |
| WO | 2016023552 A1 | 2/2016 |
| WO | 2016062846 A2 | 4/2016 |
| WO | 2016087201 A1 | 6/2016 |

* cited by examiner

TORQUE TRANSMISSION DEVICE

CROSS-REFERENCE TO RELATED APPLICATIONS

This application is the U.S. National Phase of PCT Appln. No. PCT/DE2016/200149 filed Mar. 22, 2016, which claims priority to German Application DE 10 2015 205 398.9 filed Mar. 25, 2015, the entire disclosures of which are incorporated by reference herein.

TECHNICAL FIELD

The present disclosure relates to a torque transmission device.

BACKGROUND

DE102013202661 discloses a torque transmission device which is arranged in a drive train of a motor vehicle, is arranged operatively between an input side and an output side and comprises a torque converter, which has a casing, in which a pump, a turbine and a lockup clutch for transmitting a torque between the input side and the output side are arranged, wherein the lockup clutch has an axially movable actuating element designed as a turbine for actuating the lockup clutch.

SUMMARY

It is the object of the disclosure to improve the reliability of a torque transmission device, to reduce production costs and to reduce the installation space requirement, in particular to reduce torsional vibrations when using a torsional vibration damper and/or an absorber device and/or to improve performance, in particular that of the lockup clutch.

According to the disclosure, this object is achieved by a torque transmission device having the features described herein and in the claims.

Accordingly, embodiments of this disclosure disclose a torque transmission device between an input side and an output side comprising a torque converter, which has a casing, in which a pump, a turbine, a lockup clutch for transmitting a torque between the input side and the output side, and a torsional vibration damper are arranged, wherein the lockup clutch has a clutch input coupled to the casing, a clutch output that can be rotated relative to said input, and an actuating element for actuating the lockup clutch, wherein the actuating element is moved in the direction of the output side to close the lockup clutch, wherein the torsional vibration damper has at least one first damper stage comprising a first damper input part and a first damper output part, which can be rotated to a limited extent relative to the first damper input part by the action of at least one first energy storage element, wherein an absorber mass is attached to one of the damper components. It is thereby possible, in particular, to reduce the occurrence of torsional vibrations to a greater extent.

It is also within the scope of this disclosure to provide a plurality of absorber masses, which are attached to the same damper component or are each attached to different damper components.

One embodiment of the disclosure is distinguished by the fact that the absorber mass can be rotated to a limited extent relative to said damper component by the action of a second energy storage element. The second energy storage element can be designed as a helical spring.

A preferred embodiment of the disclosure is distinguished by the fact that the actuating element and the turbine are connected to one another or of integral design and can be moved axially in common.

Another embodiment of the disclosure is distinguished by the fact that the torsional vibration damper has a second damper stage, comprising a second damper input part, a second damper output part and a third energy storage element, which is inserted operatively between the second damper input part and the second damper output part, wherein the second damper input part is connected to the first damper output part.

A further embodiment of the disclosure is distinguished by the fact that the second energy storage element is arranged operatively between the turbine and the first damper input part.

An advantageous embodiment of the disclosure is distinguished by the fact that the second energy storage element is arranged operatively between the turbine and the first damper output part.

A preferred embodiment of the disclosure is distinguished by the fact that the second energy storage element is arranged operatively between the turbine and the second damper output part.

A further embodiment of the disclosure is distinguished by the fact that a friction device is provided between the clutch input and the clutch output for opening and closing the lockup clutch, wherein the actuating element can act on the friction device to actuate the lockup clutch, wherein the friction device is arranged radially to the outside of the turbine.

A preferred embodiment of the disclosure is distinguished by the fact that a centrifugal pendulum device is provided, in particular within the casing, comprising a pendulum mass carrier and a pendulum mass, which can be pivoted to a limited extent relative to said pendulum mass carrier along a pendulum path.

A preferred embodiment of the disclosure is distinguished by the fact that the turbine forms the absorber mass or forms part of the absorber mass.

Another embodiment of the disclosure is distinguished by the fact that the turbine has an additional mass for increasing the absorber mass.

In some embodiments, the torque converter has a pump clutch, thus allowing the pump to be separated from the input side. In particular, the pump clutch is mounted within the casing.

In some embodiments, an electric motor can be connected to the torque converter.

In some embodiments, the absorber mass is designed as a separate component or as a modified component that is already present, being designed with a greater wall thickness for example.

In some embodiments, one or more absorber masses can be used, and accordingly one or more absorbers are used.

In particular, the first energy storage element is designed as a curved coil spring and/or as a straight spring.

In some embodiments, the second energy storage element can be designed as a curved coil spring and/or as a straight spring.

In some embodiments, a centrifugal pendulum is provided, in particular being arranged within the casing. One or more centrifugal pendulums can be provided. The centrifugal pendulum can be designed as an outer and/or inner centrifugal pendulum. The centrifugal pendulum can be embodied as a parallel pendulum and/or trapezoidal pendulum. One centrifugal pendulum can be designed for one order of excitation and a second centrifugal pendulum can be designed for another order of excitation.

Further advantages and advantageous embodiments of the disclosure will become apparent from the description and the figures.

BRIEF DESCRIPTION OF THE DRAWINGS

The present disclosure is described in detail below with reference to the figures. More particularly.

DETAILED DESCRIPTION

Figure 1:
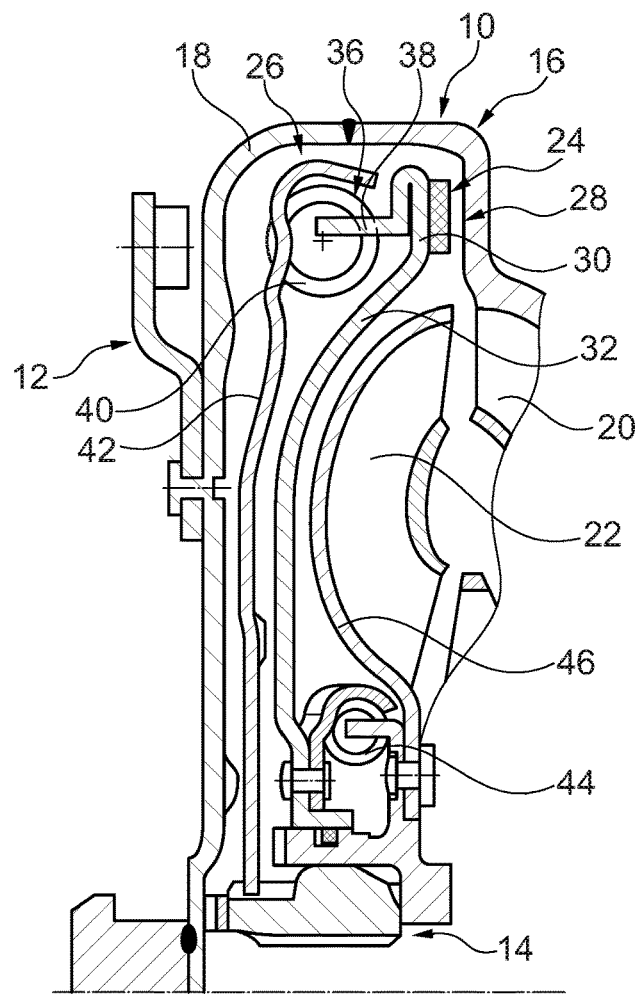
FIG. 1: shows half of a cross section through a torque transmission device in accordance with one embodiment of the disclosure.
Figure 2:
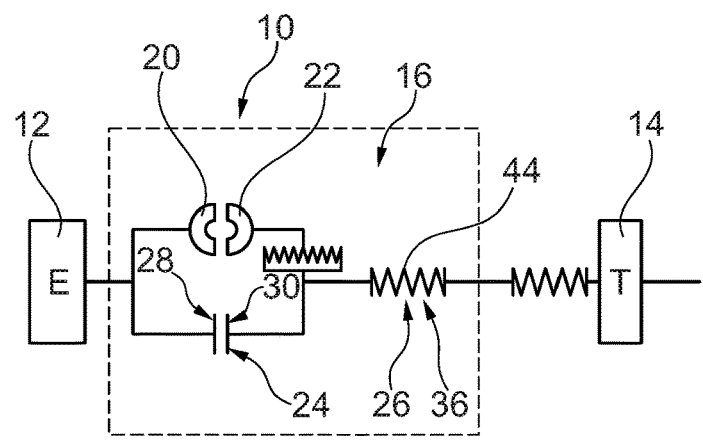
FIG. 2: shows a functional block diagram of the torque transmission device from FIG. 1.

FIG. 1 shows half of a cross section through a torque transmission device 10 in accordance with one embodiment of the disclosure. FIG. 2 shows the associated functional block diagram. The torque transmission device 10 is arranged between an input side 12 and an output side 14 and comprises a torque converter 16, which has a casing 18, in which a pump 20, a turbine 22, a lockup clutch 24 for transmitting a torque between the input side 12 and the output side 14, and a torsional vibration damper 26 are arranged.

The lockup clutch 24 has a clutch input 28 coupled to the casing 18, a clutch output 30 that can be rotated relative to said input, and an actuating element 32 for actuating the lockup clutch 24. The actuating element 32 can be moved in the direction of the output side 14 to close the lockup clutch 24. A friction device 34 is provided between the clutch input 28 and the clutch output 30 for opening and closing the lockup clutch 24, wherein the actuating element 30 can act on the friction device 34 to actuate the lockup clutch 24. In this case, the friction device 34 is arranged radially to the outside of the turbine 22, in particular also radially to the outside of the pump 20.

The torsional vibration damper 26 comprises at least one first damper stage 36, which in turn has a first damper input part 38 and a first damper output part 42, which can be rotated to a limited extent relative to the first damper input part 38 by the action of at least one first energy storage element 40.

Through the action of a second energy storage element 44, an absorber mass 46, in this case formed principally by the turbine 20, is attached to the first damper input part 38, wherein the absorber mass 46 can be rotated to a limited extent relative to the first damper input part 38.

Figure 3:
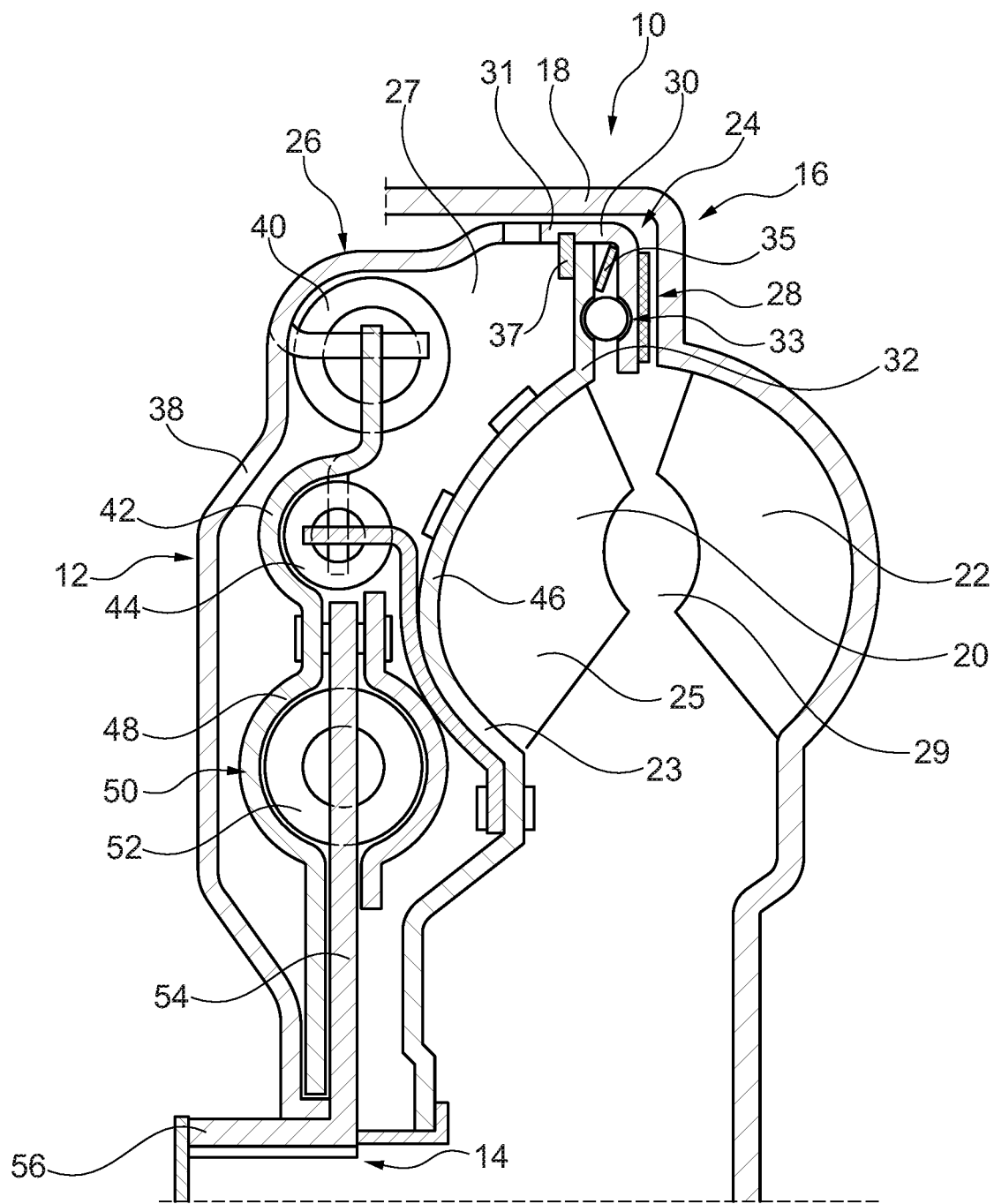
FIG. 3: shows half of a cross section through a torque transmission device in another embodiment of the disclosure.

FIG. 3 shows half of a cross section through a torque transmission device 10 in another embodiment of the disclosure. This comprises a torque converter 16, which is inserted operatively between an input side 12 and an output side 14 and which has a casing 18, in which a pump 20, a turbine 22 and a lockup clutch 24 for transmitting a torque between the input side 12 and the output side 14 are arranged. The turbine 22 comprises a turbine wheel shell 23 and turbine blades 25, which are secured thereon.

The lockup clutch 24 has an axially movable actuating element 32 for actuating the lockup clutch 24, and said actuating element is, in particular, formed integrally with the turbine 22. For this purpose, the turbine 22 is likewise axially movable and is moved to impose an axial force on the lockup clutch 24 by a pressure difference between the toroidal space 29 and the outer space 27. The force imposition takes place, in particular, between the turbine 22 and the clutch output 30, which is here designed more specifically as a plate element 31. The clutch output 30 can be rotated relative to the turbine 22, in this case, in particular, through the action of a bearing device 33.

As a seal between the turbine 22 and the clutch output 30, it is possible to provide a sealing element 35, which is here designed, in particular, as a diaphragm spring. A retaining ring 37 can be inserted to exert a preload on the sealing element 35.

The casing 18 forms, in particular, the clutch input 28 of the lockup clutch 24, and the plate element 31 forms, in particular, the clutch output 30 of the lockup clutch 24. In general, the clutch output 30 is arranged on a first damper input part 38 of a torsional vibration damper 26 or is formed integrally with said part. In this case, the first damper input part 38 acts via first energy storage elements 40 on a first damper output part 42, which can be rotated to a limited extent relative to the first damper input part 38 and, in this case, is designed, in particular, as a damper intermediate part, which, in turn, forms a second damper input part 48 of a downstream second damper stage 50 and which acts via third energy storage elements 52 on a second damper output part 54, which can be rotated to a limited extent relative to the second damper input part 48.

The second damper output part 54 is connected to an output hub 56, in particular for conjoint rotation. The turbine 22 is connected through the action of a second energy storage element 44 on the first damper output part 42 as an absorber mass 46, wherein the absorber mass 46 can be rotated to a limited extent relative to the first damper output part 42. It is thereby possible, in particular, to reduce the occurrence of torsional vibrations to a greater extent.

Figure 4:
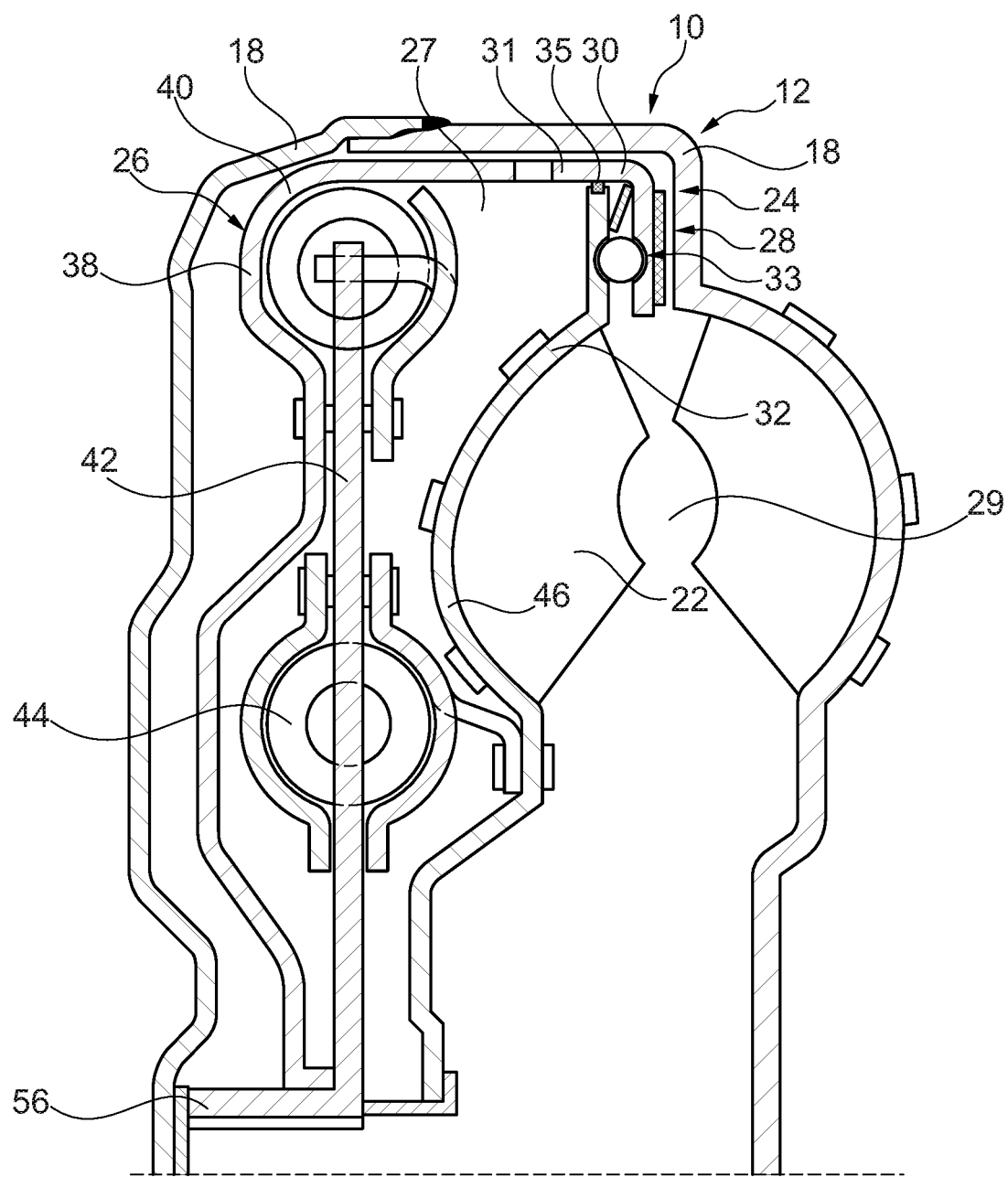
FIG. 4: shows half of a cross section through a torque transmission device in another embodiment of the disclosure.

FIG. 4 shows half of a cross section through a torque transmission device 10 in another embodiment of the disclosure. Here, the lockup clutch 24 has an axially movable actuating element 32 for actuating the lockup clutch 24, said element being formed, in particular, integrally with the turbine 22. For this purpose, the turbine 22 is likewise axially movable and is moved to impose an axial force on the lockup clutch 24 by a pressure difference between the toroidal space 29 and the outer space 27. The force imposition takes place, in particular, between the turbine 22 and the clutch output 30, which is here designed more specifically as a plate element 31. The clutch output 30 can be rotated relative to the turbine 22, in this case, in particular, through the action of a bearing device 33.

As a seal between the turbine 22 and the clutch output 30, it is possible to provide a sealing element 35, which is here designed, in particular, as a sealing ring and is accommodated in a seal carrier, which more specifically is here formed integrally with the actuating element 32.

The casing 18 forms, in particular, the clutch input 28 of the lockup clutch 24, and the plate element 31 forms, in particular, the clutch output 30 of the lockup clutch 24. In general, the clutch output 30 is arranged on a first damper input part 38 of a torsional vibration damper 26 or is formed integrally with said part. In this case, the first damper input part 38 acts via first energy storage elements 40 on a first damper output part 42, which can be rotated to a limited extent relative to the first damper input part 38.

The first damper output part 42 is connected to an output hub 56, in particular for conjoint rotation. The turbine 22 is connected through the action of a second energy storage element 44 on the first damper output part 42 as an absorber mass 46, wherein the absorber mass 46 can be rotated to a limited extent relative to the first damper output part 42. It is thereby possible, in particular, to reduce the occurrence of torsional vibrations to a greater extent.

LIST OF REFERENCE NUMBERS

- 10 torque transmission device
- 12 input side
- 14 output side
- 16 torque converter
- 18 casing
- 20 pump
- 22 turbine
- 23 turbine wheel shell
- 24 lockup clutch
- 25 turbine blades
- 26 torsional vibration damper
- 27 outer space
- 28 clutch input
- 29 toroidal space
- 30 clutch output
- 31 plate elements
- 32 actuating element
- 33 bearing device
- 34 friction device
- 35 sealing element
- 36 damper stage
- 37 retaining ring
- 38 damper input part
- 40 energy storage element
- 42 damper output part
- 44 energy storage element
- 46 absorber mass
- 48 damper input part
- 50 damper stage
- 52 energy storage elements
- 54 damper output part
- 56 output hub

The invention claimed is:

1. A torque transmission device between an input side and an output side and comprising a torque converter, which has a casing, in which a pump, a turbine, a lockup clutch for transmitting a torque between the input side and the output side, and a torsional vibration damper are arranged, wherein the lockup clutch has a clutch input coupled to the casing, a clutch output that can be rotated relative to said input, and an actuating element for actuating the lockup clutch, wherein the actuating element is moved in a direction of the output side to close the lockup clutch, wherein the torsional vibration damper has at least one first damper stage comprising a first damper input part and a first damper output part, which can be rotated relative to the first damper input part by action of at least one first energy storage element, wherein at least one absorber mass is attached to one of the first damper input part and the first damper output part, and wherein the actuating element is connected between the first damper input part and a second energy storage element.

2. The torque transmission device as claimed in claim 1, wherein the absorber mass can be rotated relative to the first damper input part or the first damper output part by action of the second energy storage element.

3. The torque transmission device as claimed in claim 1, wherein the actuating element and the turbine are connected to one another or of integral design and can be moved axially in common.

4. The torque transmission device as claimed in claim 2, wherein the second energy storage element is arranged operatively between the turbine and the first damper input part.

5. The torque transmission device as claimed in claim 1, wherein a friction device is provided between the clutch input and the clutch output for opening and closing the lockup clutch, wherein the actuating element can act on the friction device to actuate the lockup clutch, wherein the friction device is arranged radially outside of the turbine.

6. The torque transmission device as claimed in claim 1, wherein the turbine forms the absorber mass or forms part of the absorber mass.

7. The torque transmission device as claimed in claim 6, wherein the turbine has an additional mass for increasing the absorber mass.

* * * * *